US 6,744,004 B2

(12) United States Patent
Melekian et al.

(10) Patent No.: US 6,744,004 B2
(45) Date of Patent: Jun. 1, 2004

(54) METHOD FOR WELDING A DIFFERENTIAL HOUSING

(75) Inventors: Joseph Melekian, Rochester, MI (US); Robert H. Davis, Woodbine, MD (US); Steven M. Foster, Rochester, MI (US); Nathan Allen Clark, Warren, MI (US); David M. Donegan, West Bloomfield, MI (US); Bogdan Kolodziej, Clarkston, MI (US); James Edward Levinson, Asheville, NC (US); George Richard Thatcher, Asheville, NC (US); William T. Polesnak, Troy, MI (US); Kenneth Kinfun Yu, Clarkston, MI (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 48 days.

(21) Appl. No.: 09/779,961

(22) Filed: Feb. 9, 2001

(65) Prior Publication Data

US 2002/0108467 A1 Aug. 15, 2002

(51) Int. Cl.⁷ .......................... B23K 11/04; B23K 20/12
(52) U.S. Cl. .................... 219/100; 219/101; 228/114.5; 228/113
(58) Field of Search .......................... 219/97, 100, 101; 228/112.1, 114.5, 113, 2.1, 2.3

(56) References Cited

U.S. PATENT DOCUMENTS

| | | | | |
|---|---|---|---|---|
| 1,323,178 A | * | 11/1919 | Gale | 219/100 |
| 1,828,340 A | * | 10/1931 | Reed | 301/79 |
| 2,911,516 A | * | 11/1959 | Cox | 219/101 |
| 3,251,127 A | * | 5/1966 | Tonelli | 228/196 |
| 4,221,138 A | * | 9/1980 | Stewart et al. | 74/607 |
| 4,552,609 A | * | 11/1985 | Larsen | 156/358 |
| 4,733,044 A | * | 3/1988 | Kuchuk-Yatsenko et al. | 219/100 |
| 4,754,847 A | * | 7/1988 | Glaze et al. | 184/6.12 |
| 5,248,077 A | | 9/1993 | Rhoades et al. | |
| 5,442,977 A | * | 8/1995 | Danjou et al. | 74/607 |
| 5,591,360 A | | 1/1997 | Mombo-Caristan | |
| 6,095,402 A | * | 8/2000 | Brownell et al. | 228/112.1 |
| 6,106,233 A | * | 8/2000 | Walker et al. | 416/213 R |
| 6,237,834 B1 | * | 5/2001 | Mahoney et al. | 228/112.1 |

\* cited by examiner

Primary Examiner—Kiley Stoner
Assistant Examiner—Kevin L McHenry
(74) Attorney, Agent, or Firm—Carlson, Gaskey & Olds PC

(57) ABSTRACT

A method of welding an axle housing surface to a blank surface includes generated heat in one of the two components. Heat is generated from at least one of these surfaces at their interface sufficient to weld them together. The surfaces are then applied together.

10 Claims, 3 Drawing Sheets

METHOD FOR WELDING A DIFFERENTIAL HOUSING

BACKGROUND OF THE INVENTION

This invention relates to a method for welding an axle housing.

An axle housing provides a protective covering for the differential that couples the drive shaft to the axle. Typically, the axle housing is shaped like a bowl. Another collar, known as a snorkel, is mounted on top of the axle housing to support the coupling thru shaft between tandem axles. Generally, the axle housing and snorkel are made of steel and are two separate pieces.

Currently, the snorkel housing is mounted to the axle housing by arc welding the two housings together. In this process, the weld is produced by the extreme heat of an electric arc drawn between an electrode and the seam between the two housings. The arc melts the mating surfaces of the two housings together. This process is conducted around the seam of the two housing until they are sufficiently welded together.

However, because of the curved shape of the axle housing and the snorkel, problems arise welding the housing surface to the snorkel surface. Specifically, at times, a welder may experience difficulty positioning the electrode close enough to the seam to be welded due to the curvature of these surfaces and shape of the housings. As a consequence, excess splatter, poor weld penetration, porosity of the weld, and other issues may arise concerning the weld.

A need therefore exists to weld the axle housing to the snorkel in a manner that avoids these production issues that arise from arc welding.

SUMMARY OF THE INVENTION

In a disclosed embodiment of this invention, the method of welding the housing comprises providing an axle housing surface and a blank surface to be welded together. In contrast to arc welding, heat is generated from at least one of these surfaces at their interface instead of away from the surfaces to be welded by an electrode. The surfaces are then applied together. Because heat is generated from at least one of the surfaces at their interface, this method of welding avoids the difficulty of attempting to position a heat source near the curved surface of the axle housing.

The heat may be generated by electric discharge between the surfaces. The electric discharge results from creating an electric potential between the surfaces and moving the surfaces in proximity to each other to effect the electric discharge. To further weld the surfaces together, the surfaces are moved apart and another electric potential is created between the surfaces. The surfaces are moved together to effect the electric discharge. Again, the surfaces are applied together. This process may be repeated until the surfaces are sufficiently welded together.

Additionally, heat may also be generated by friction welding the surfaces together. Rubbing the surfaces against each other in a translational or rotational manner creates heat. The surfaces are applied together.

The axle housing surface is curved. The blank surface may be a snorkel. The product resulting from this process will have better weld penetration and reduced weld porosity.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
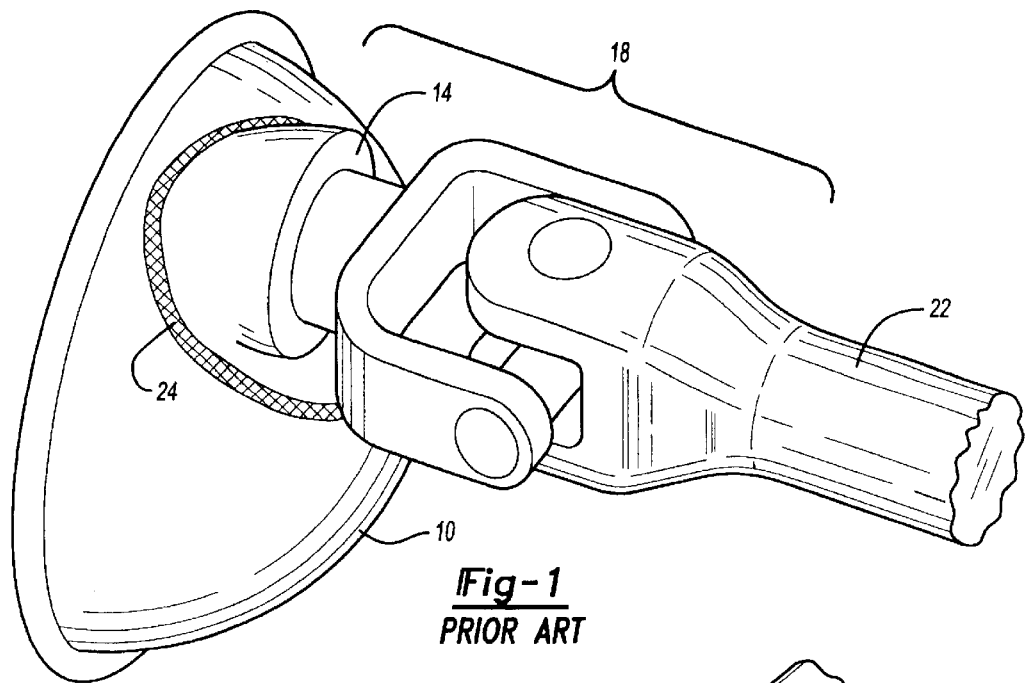
FIG. 1 shows an axle housing and snorkel in their environment as known in the prior art.

FIG. 1 illustrates axle housing 10 and snorkel 14 in their environment with connecting universal joint 18 and drive shaft 22. Typically, axle housing 10 and snorkel 14 are made of steel or other common metal. As shown in the figure, weld 24 skirts the periphery of snorkel 14. In the prior art, an arc welder is used to mount snorkel 14 to axle housing 10.

Figure 1A:
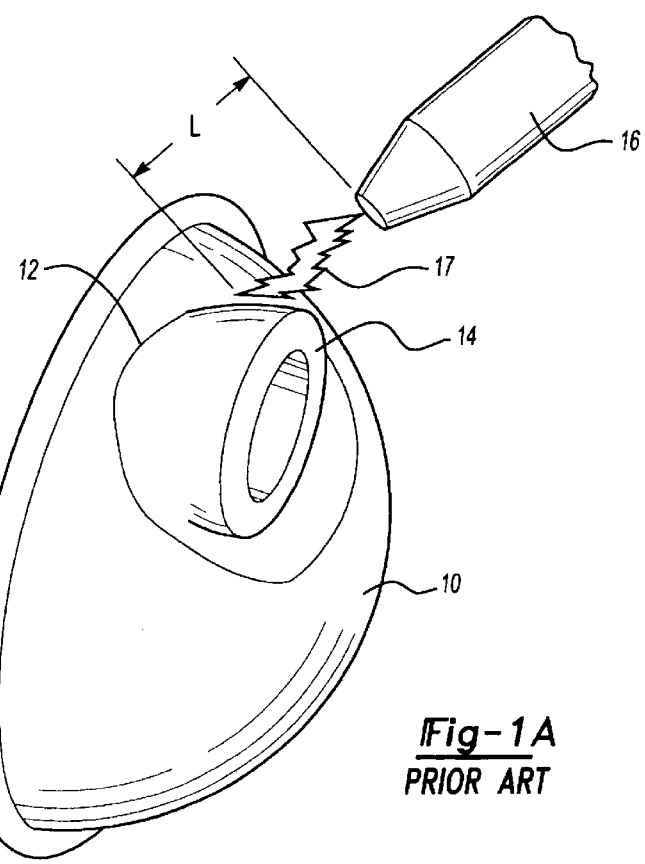
FIG. 1A shows the arc welding of the axle housing and snorkel as known in the prior art.

FIG. 1A shows the arc welding of axle housing 10 and snorkel 14 as known in the art. Electrode 16 creates arc 17 a distance L from seam 12. The curvature of axle housing 10 and snorkel 14 prevents electrode 16 from approaching seam 12 at a shorter or more optimal distance less than distance L, leading to splatter, excess weld porosity, poor weld penetration, and other weld issues.

Figure 2:
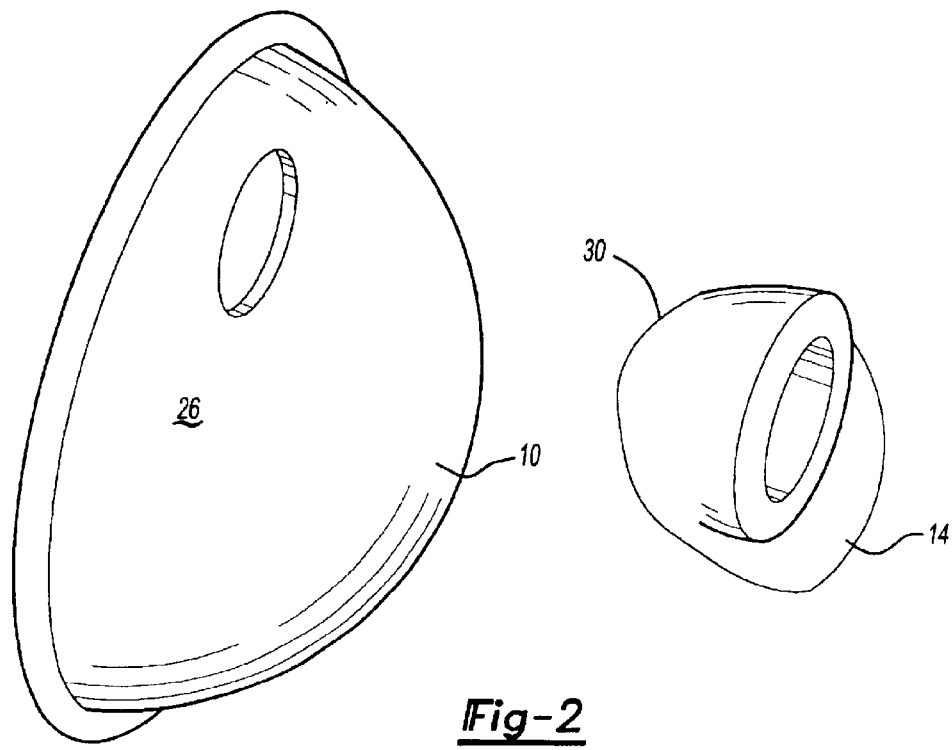
FIG. 2 shows an exploded view of the axle housing surface and snorkel surface of FIG. 1 prior to the creation of heat from at least one of these surfaces at their interface.

FIG. 2 shows an exploded view of axle housing 10 and snorkel 14 prior to welding. Axle housing surface 26 and blank surface 30 are provided. Blank surface 30 may be the surface of snorkel 14, as illustrated, or any other attachment to be mounted to axle housing 10. As illustrated, axle housing surface is curved. The invention comprises the creation of heat from at least one of the surfaces (26, 30) at their mating surface or interface to thereby weld the surfaces together.

Figure 3:
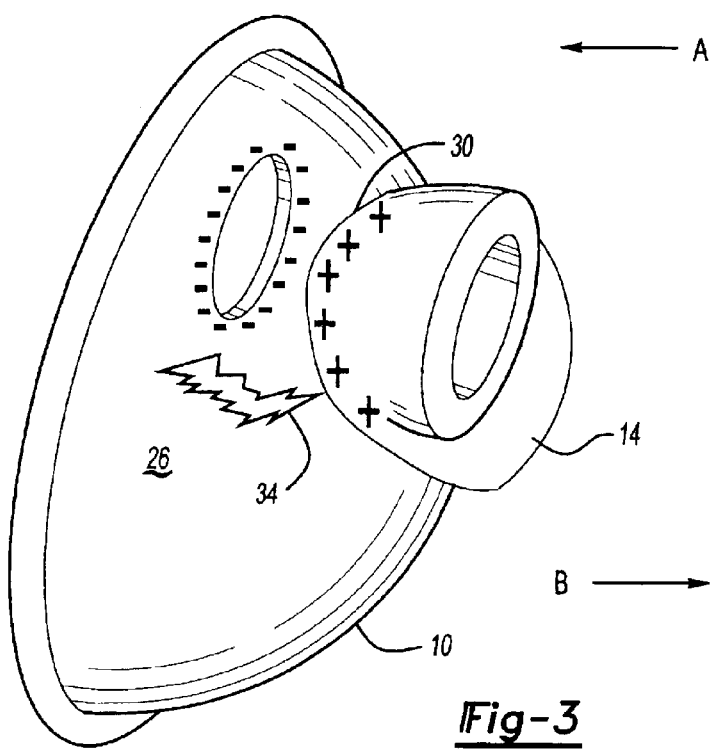
FIG. 3 shows a specific example of the embodiment of FIG. 2 wherein the heat from at least one of the surfaces is created by the generation of an electric discharge at their interface.

FIG. 3 shows an embodiment of the method of welding of the invention wherein an electric discharge welds axle housing 10 to snorkel 14. Here, axle housing surface 26 and blank surface 30 are charged to create an electric potential between the surfaces. As shown, blank surface 30 is charged positively while axle housing surface 26 is negatively charged. Alternatively, blank surface 30 may be charged negatively while axle housing surface 26 is charged positively. The surfaces are then moved in proximity to effect electric discharge 34 between the surfaces either by moving blank surface 30 in direction A, moving axle housing surface 26 in direction B, or moving both surfaces together. Heat from electric discharge 34 melts blank surface 30 and axle housing surface 26 at their interface. Surfaces 26 and 30 are then applied to each other under pressure while surfaces are molten.

Figure 4:
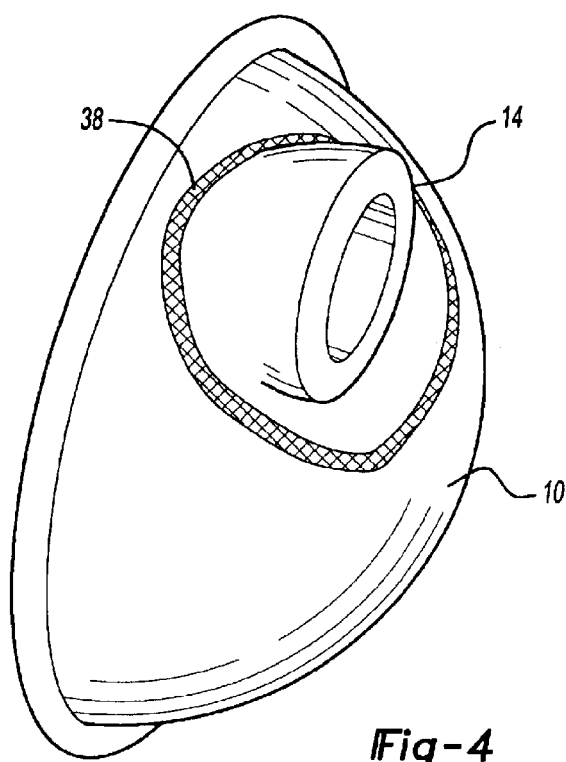
FIG. 4 shows the embodiment of FIG. 3 following electric discharge.

Although it is preferable to complete the welding process employing this process once, the process may be repeated to increase the amount of the weld. In other words, the surfaces may be moved apart to create another electric potential between the surfaces. The surfaces are again moved in proximity to each other to effect the electric discharge between the surfaces. Following discharge, the surfaces are applied together. This process may be repeated until the surfaces are sufficiently welded together. FIG. 4 illustrates the resulting weld 38. While welding by creating an electric potential between two surfaces to be welded is common, its application to an axle housing is unique and permits welding without interference from the curvature of axle housing surface 26. However, one skilled in the art would know how to apply such welding techniques to the claimed application.

Figure 5:
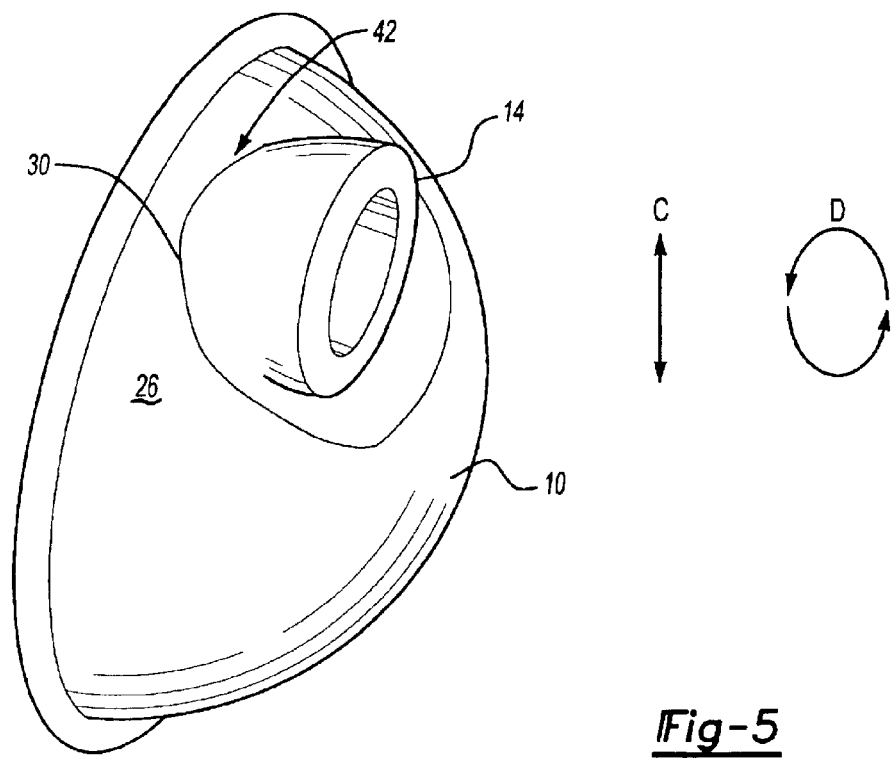
FIG. 5 shows the axle housing and snorkel of FIG. 2 wherein the heat at the interface is created by the generation of friction heat from at least one of the surfaces at the interface.

As shown in FIG. 5, another means to generate heat from the axle housing surface and the blank surface at their interface is through friction welding these surfaces together. Axle housing 10 and snorkel 14 are rubbed against each other either in a translational (double arrow C) or in a rotational (arrow D) direction so that frictional heat is created at interface 42 between axle housing surface 26 and blank surface 30. When welding metal surfaces, it is, however, preferably that the movement to create the friction be rotational. Irrespective of the direction of the rotation or the direction of the translational movement, the two surfaces move in different directions relative to each to create frictional heat. The heat from this process will melt a portion of axle housing surface 26 and blank surface 30. The surfaces are applied against each other during this process. In this manner, the two surfaces, 26 and 30, are welded together again without interference from the curvature of axle housing 10. Again, friction welding techniques are known generally but have never been applied to the inventive components.

While the foregoing embodiments involve differing steps, their common feature is the generation of heat from at least one of the surfaces at their interface. This feature distinguishes this process from the prior art in which the heat is created by an electrode near the surfaces to be welded. Because the heat is generated from at least one of the surfaces and at their interface, the curvature of the axle housing or the snorkel does not interfere with the welding process. The product resulting from this process is thereby produced with less effort.

The aforementioned description is exemplary rather then limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. A method of welding comprising the steps of:
   providing a differential housing surface;
   providing a blank surface;
   generating heat from at least one of these surfaces at their interface sufficient to weld the surfaces together; and
   applying the surfaces together.

2. The method of claim 1 wherein the heat is generated by electric discharge between the surfaces.

3. The method of claim 2 wherein the electric discharge results from creating an electric potential between the surfaces and moving the surfaces in proximity to each other to effect the electric discharge.

4. The method of claim 3 further including the step of moving the surfaces apart, creating another electric potential between the surfaces, moving the surfaces in proximity to each other to effect the electric discharge between the surfaces, and applying the surfaces together.

5. The method of claim 4 repeated until the surfaces sine sufficiently welded together.

6. The method of claim 1 wherein the heat is generated by friction between the surfaces.

7. The method of claim 6 wherein the friction is created by moving one surface translationally relative to the other surface.

8. The method of claim 6 wherein the friction is created by moving one surface rotationally relative to the other surface.

9. The method of claim 1 wherein the differential housing surface is curved.

10. The method of claim 1 wherein the blank surface is a snorkel.

* * * * *

UNITED STATES PATENT AND TRADEMARK OFFICE
CERTIFICATE OF CORRECTION

PATENT NO.    : 6,744,004 B2
DATED         : June 1, 2004
INVENTOR(S)   : Melekian et al.

It is certified that error appears in the above-identified patent and that said Letters Patent is hereby corrected as shown below:

<u>Column 4,</u>
Line 28, "sine" should be -- are --

Signed and Sealed this

Ninth Day of November, 2004

JON W. DUDAS
*Director of the United States Patent and Trademark Office*